United States Patent [19]

Tischer et al.

[11] 4,384,764
[45] May 24, 1983

[54] VIEWING ANGLE CONTROL FOR LIQUID-CELL DISPLAY DEVICE

[75] Inventors: Kurt M. Tischer, Unterensingen; Fritz Tröster, Hessigheim; Klaus-Peter Voigt, Esslingen; Rolf Zondler, Stuttgart-Neugereut, all of Fed. Rep. of Germany

[73] Assignee: International Standard Electric Corporation, New York, N.Y.

[21] Appl. No.: 185,699

[22] Filed: Sep. 10, 1980

[30] Foreign Application Priority Data

Sep. 13, 1979 [DE] Fed. Rep. of Germany ....... 2937054

[51] Int. Cl.³ ............................................. G02P 1/133
[52] U.S. Cl. ..................... 350/345; 350/334; 350/338
[58] Field of Search ................... 350/330, 331 R, 338, 350/345, 334, 267, 362

[56] References Cited

U.S. PATENT DOCUMENTS

| 3,811,751 | 5/1974 | Myer | 350/345 |
| 4,021,945 | 5/1977 | Sussman | 350/345 |
| 4,212,048 | 7/1980 | Castleberry | 350/338 X |

OTHER PUBLICATIONS

Jenkins, F. A., *Fundamentals of Optics,* McGraw Hill Book Company, Inc., N.Y., 1957, p. 15.

*Primary Examiner*—John K. Corbin
*Assistant Examiner*—David Lewis
*Attorney, Agent, or Firm*—John J. O'Halloran

[57] ABSTRACT

A rear plate of a liquid-cell display device has louvers embedded therein that allow light to pass from the rear of the display device toward the front only at angles that will cause most or all of the light to be internally reflected at the front plate unless the light has been scattered by the light-scattering fluid of the device.

3 Claims, 1 Drawing Figure

U.S. Patent
May 24, 1983
4,384,764
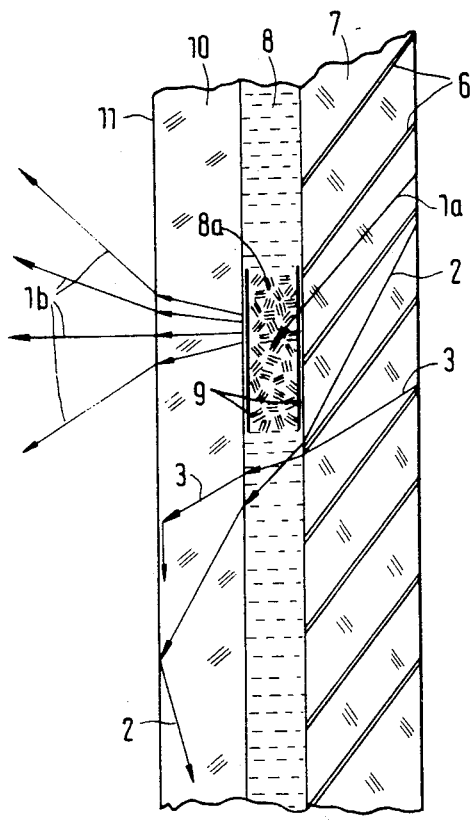

VIEWING ANGLE CONTROL FOR LIQUID-CELL DISPLAY DEVICE

The present invention relates to a display device with a liquid cell.

A display device of this kind is described, for example, in German Patent Application No. P 28 45 858.4. The light-control film shown there has a limited viewing angle.

However, there are cases where a wider viewing angle is desired within which the passage of the non-scattered light beams to the front of the display is blocked or at least largely reduced.

SUMMARY OF THE INVENTION

Accordingly, the object of the invention is to provide a display device of the above kind which has a wider viewing angle undisturbed by direct passage of light.

The advantage of the invention is that light passing through directly to the front side emerges from the display at a very flat angle at the most, but then with reduced intensity.

An embodiment of the invention will now be explained in more detail with reference to the accompanying drawing.

BRIEF DESCRIPTION OF THE DRAWING

The drawing shows schematically the essential parts of a display device according to one embodiment of the invention.

DETAILED DESCRIPTION OF THE PREFERRED EMBODIMENTS

A fluid 8 is sandwiched between plates 10 and 7. The inner surfaces of the plates are coated with transparent electrodes 9.

In the region 8a the fluid is switched to the scattering state by applying a voltage between the electrodes 9, which are effective for this region, while in the other regions, whose electrodes are not subjected to a voltage, the fluid remains transparent.

The plate 7 is designed as a light-control film consisting of louvers 6 embedded in the medium of the plate 7. A viewer looking at the front side 11 of the liquid cell sees the dark color of the louvers 6 in the transparent region of the fluid 8, and a bright character on a dark background in the scattering region 8a. The fluid 8 may be a liquid crystal or a colloid, for example.

The operation of the display device will now be explained with the aid of three light beams shown by way of example. A first light beam 1 passes as a beam 1a through the light-control film 7 and falls on the scattering region 8a of the fluid 8. Part of the scattered light leaves the front side 11 of the display as beams 1b in accordance with the laws of reflection, and appears to the viewer as a bright spot.

The light beam 2 is not scattered in the fluid 8, so it passes through the fluid 8 and the plate 10 in accordance with the laws of reflection and, if the inclination of the louvers is chosen in accordance with the invention, strikes the front side 11 at an angle at which it is totally reflected.

While the light beam 2 passes through the light-control film at the flattest possible angle, a light beam 3 is shown as another example which passes through at the steepest possible angle.

As shown in the figure, the embodiment is designed so that this light beam 3 is reflected at the front side 11 at the critical angle, so that no light passing through the light-control film and falling on the transparent region of the fluid 8 can leave the front side 11 of the display.

If a very flat angle of the louvers is not desired, an advantageous arrangement, that will allow some of the non-scattered light beams to leave the front of the display, can be provided by using a steeper angle for the louvers so that a light beam passing through film 7 at the steepest possible angle will pass through film 10 after passing through a transparent portion of the fluid 8.

The medium in front of the front side 11 of the display will normally be air. The invention can also, of course, be used with a medium other than air, taking into account the reflection laws.

Although this invention has been described by referring to specific embodiments thereof, it will be understood that various changes and modifications will be suggested to one skilled in the art, and it is intended to encompass such changes and modifications as are within the scope of the following claims.

What is claimed is:

1. A liquid display device of the type having a normally transparent fluid disposed between two transparent electrodes deposited on a front and a rear plate comprising transparent media wherein said transparent fluid will scatter light passing therethrough upon the application of a voltage between said electrodes, the improvement comprising opaque louver means associated with said rear plate transparent medium for allowing a light beam to pass through said rear plate toward said front plate only when the light beam strikes said rear plate within a predetermined range of angles relative to the rear plate, wherein said range of angles is chosen so that a light beam passing through the rear plate at the steepest angle that will allow light to pass the louver means and through a transparent portion of the fluid will be internally reflected at the face of the front plate out of the line of sight of a viewer at the front side of the device regardless of viewing angle to provide a dark background.

2. The device recited in claim 1 wherein said louver means comprise a plurality of planar slats all disposed at the same angle relative to the rear plate.

3. The device recited in claim 1 or 2 wherein said louver means are embedded in said rear plate transparent medium.

* * * * *